Figure 3:
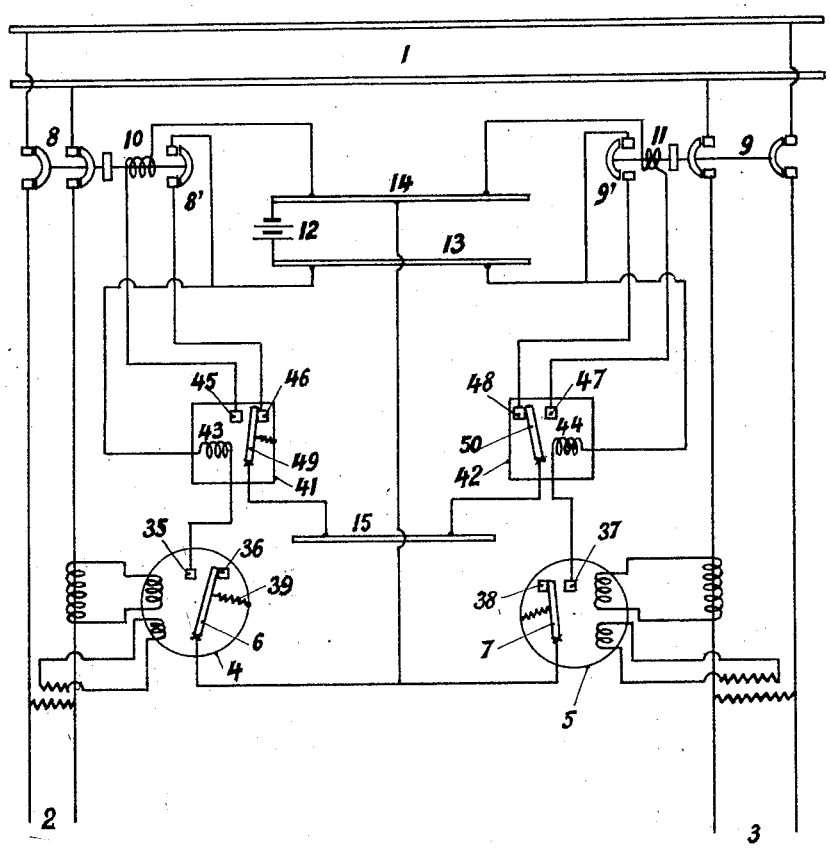

March 28, 1933. L. G. DUPUIS ET AL 1,903,033
PROTECTING DEVICE FOR ELECTRIC DISTRIBUTING SYSTEMS
Filed Nov. 3, 1927 2 Sheets-Sheet 1
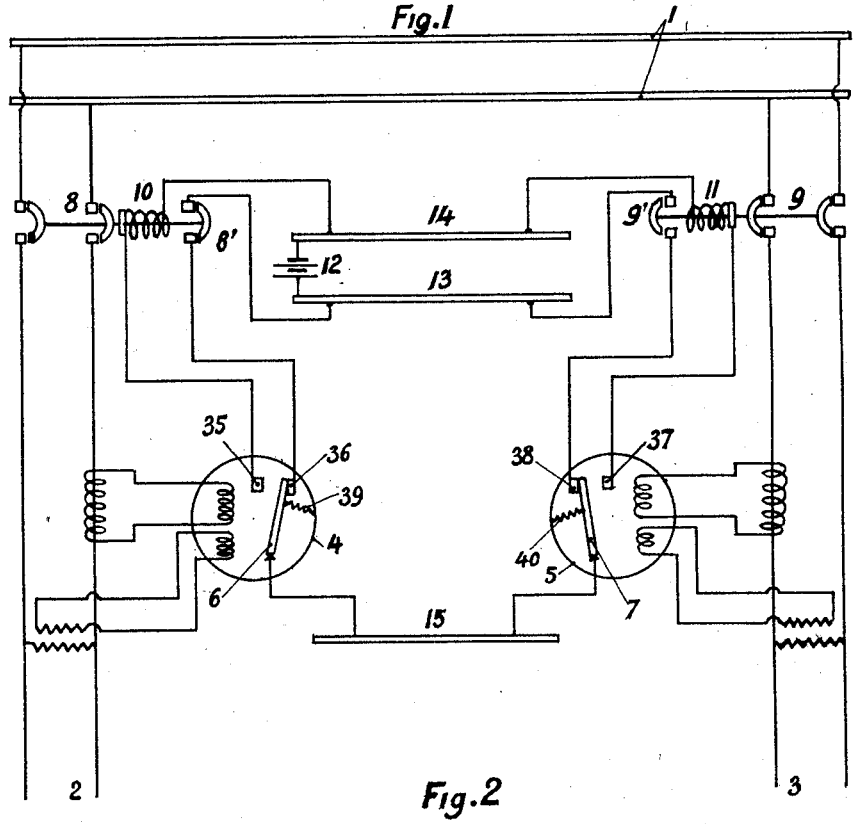
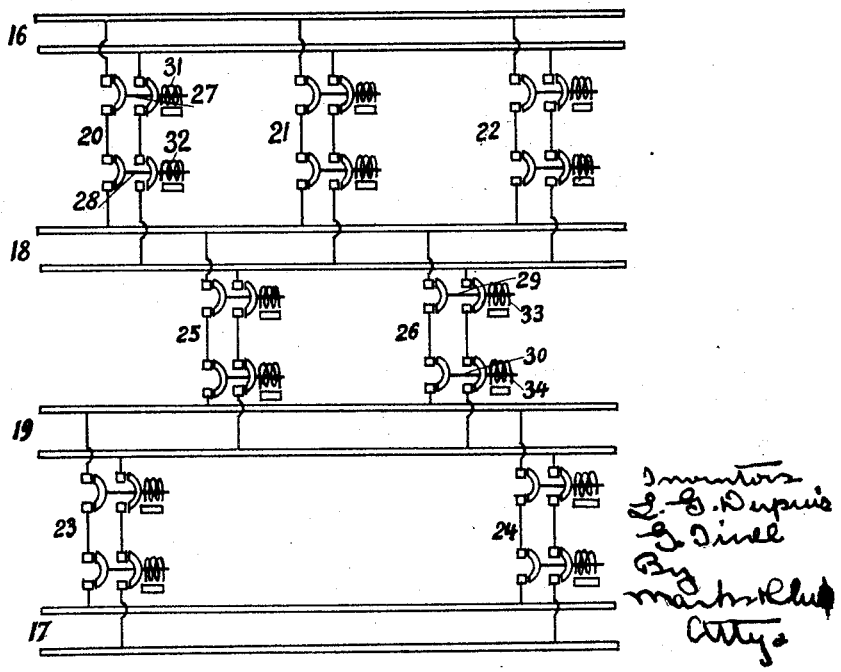

Patented Mar. 28, 1933

1,903,033

UNITED STATES PATENT OFFICE

LUCIEN GEORGES DUPUIS AND GEORGES TINEL, OF PARIS, FRANCE, ASSIGNORS TO UNION D'ELECTRICITE, OF PARIS, FRANCE, A COMPANY OF FRANCE

PROTECTING DEVICE FOR ELECTRIC DISTRIBUTING SYSTEMS

Application filed November 3, 1927, Serial No. 230,874, and in France March 5, 1927.

The substations of electric distribution mains are generally fed from one or more generating stations through the so-called feeders. If any defect occurs in the feeders it is important that said feeder should be automatically disconnected at both ends. It has already been proposed to this end to use a power directional relay controlled by the feeder and adapted to actuate an automatic switch fed through a local supply of energy so as to disconnect the feeder. Now such arrangements are intricate and difficult to regulate.

Our invention has for its object a simple device allowing the disconnection of the two ends of a defective feeder through the agency of any suitable switch actuated by power directional relays fed by the feeder, the contacts of said relays being connected in a novel and improved manner.

In the accompanying drawings given by way of example Fig. 1 is a general wiring diagram illustrating our invention and Fig. 2 shows diagrammatically the working thereof.

Fig. 3 shows a modification.

The principle of our invention may be easily understood from inspection of Fig. 1. We have shown at 1 the bus bar of a substation assumed to be fed with single phase current. The feeders 2 and 3 fed by said bus bar are connected with power directional relays adapted to control the movable contact pieces 6 and 7 respectively.

The feeders can be disconnected from the bus bar through the agency of the circuit breakers or automatic switches 8 and 9 which break the circuit when current passes through the trip coil 10 or 11 of the switch considered. The trip coils may be energized by the local electric supply 12 feeding the two bus bars 13 and 14. The trip coils of the switches are connected on one hand in a permanent manner with one bus bar 14 and on the other hand with an auxiliary bus bar 15 for suitable positions of the movable contacts 6 and 7 provided the auxiliary switches 8' and 9' mechanically controlled by the automatic switches 8 and 9 respectively are closed. Thus it is obvious that it is necessary, for operation of the circuit breaker 8 or 9, that the trip coil of the corresponding relay should be connected with the auxiliary bus bar 15 and the latter with the bus-bar 13; consequently the two following conditions must prevail for the working of a circuit breaker: the corresponding relay is in operating position and one at least of the others is in rest position; the relays 4 and 5 and their stationary or rest contacts are disposed in a manner such that these connections are provided only when a feeder is to be disconnected.

In Fig. 2 the distribution mains are shown with two generating stations at 16 and 17 and two sub-stations at 18 and 19 are shown diagrammatically by their bus bars. The central station 16 and the substation 18 are connected by the three feeders 20, 21, 22, the central station 17 and the substation 19 by the feeders 23 and 24 and the substations 18 and 19 by the feeders 25 and 26. At each end of the feeders are switches such as 27, 28, 29 and 30 corresponding to the switches 8 and 9 of Fig. 1, said switches being controlled by the coils 31, 32, 33, 34 corresponding to the coils 10 and 11 of Fig. 1.

When a feeder is fed at one end with electric energy from the bus bars with which it is connected, we will hereinafter say it acts as a receiver at this end; if on the contrary it feeds energy to the bars, we will say it acts as a generator. Thus if the generating station 16 of Fig. 2 is operative, the feeders 20, 21 and 22 act as receivers at their end 16 and as generators at their end 18.

The following properties of the feeders are obvious.

1. The feeders connecting two sets of bus bars and none of which is defective act as receivers at one end and as generators at the other.

2. A defective feeder i. e. showing a short-circuit acts as a receiver at both ends.

3. Between the sets of bus bars connected through a defective feeder, the feeders all act as receivers at one end and at the other end the defective feeder acts as a receiver and the others act as generators.

To each cut-out switch corresponds a relay of the type illustrated diagrammatically at 4 and 5 on Fig. 1. These relays, as stated, comprise a movable part 6 or 7, stationary or rest contacts 36, 38 and working or operative contacts 35, 37. These relays are arranged in a manner such that:

The power directional relay 4, for instance, is so disposed that the movable part remains on its rest contact 36 when the feeder acts as a generator at the corresponding end; on the other hand, said movable part is controlled, for instance, by means of the tension of the spring 39, so that it always remains on the rest contact 36 even when the feeder acts as a receiver, unless the energy received by said feeder is greater than a certain predetermined amount. Consequently, a relay comes in the working position only if the two following conditions prevail simultaneously:

*a.* The corresponding feeder acts as a receiver at the said end.

*b.* This feeder receives an amount of energy greater than a predetermined value.

For these conditions, the operation is easily understood. Suppose, for instance, that the feeder 22 of the network shown in the Figure 2 becomes short-circuited. The three feeders 20, 21 and 22, which act as receivers at 16, will each receive a very great amount of energy, above the predetermined value; the feeder 22, because it is short-circuited, and the feeders 20 and 21, because they are connected to said short-circuit by the bars of the station 18.

It will follow that, at the station 16, the three feeders acting as receivers and the amount of energy being greater than the predetermined value, the three relays will become operative, and the bar 13 will be wholly disconnected from the bar 15 and no current will therefore pass through the trip coils of the circuit breakers, thus the said breakers will not act.

At the station 18, the feeders 20 and 21 will act as generators, and therefore the corresponding relays will remain in the rest position; on the contrary, the feeder 22 at the station 18 will act as a receiver and will receive an amount of energy greater than the predetermined value; so, the corresponding relay will move to operating position and the circuit breaker at this point is actuated and disconnects the defective feeder from the bars of the station 18.

At this moment, at the station 16, the three feeders act as receivers, but whereas the feeder 22 will receive an amount of energy greater than the predetermined value, which will maintain the corresponding relay in its operating position, the feeders 20 and 21 feed no more current in the defective feeder over the bars of the station 18 and thus the power they transmit to the station 18 decreases; said power is, of course, greater than before the feeder 22 became defective thereby requiring the two feeders to transmit the power which, before was transmitted by the three feeders, but the relays may be so adjusted that the power which thus passes through the feeders 20 and 21 is still under predetermined value; consequently the movable parts of the relays corresponding to these feeders 20 and 21 urged by their springs are returned to their rest contacts.

In such condition, the circuit breaker of the feeder 22 is actuated and the defective feeder, already disconnected at the station 18, is also disconnected from the bars at the station 16 and thus completely cut out.

It is easy to understand that this manner of working is the same in the case of any number of parallel feeders, provided the movable parts of the relays corresponding to each feeder are all connected to the bus bar 15 and the rest contacts with the bus bar 13.

On the drawings switches 8' and 9' are shown actuated by the circuit breakers and disconnecting the rest contact 36 from the bar 14 when said circuit breaker is operative. These switches are not entirely necessary and may be dispensed with. Nevertheless they are useful for preventing an unnecesary use of the current fed by the supply 12 to the trip coils after the working of the circuit breaker.

It will be well understood that the above description of one-phase mains is by no means limitative and that it applies as well to polyphase mains.

Fig. 3 shows the same arrangement wherein we use in addition to the power directional relays 4 and 5 intermediary relays 41, 42. These are necessary if the size of the main relays 4 and 5 is not sufficient to support the current required for operation by the trip coils 10 and 11. The exciting coils 43, 44 of the intermediary relays are connected on one end with the pole 13 of the local supply and on the other with the working contacts 35, 37 of the corresponding main relay; the movable contacts 6, 7 are connected with the pole 14 of the local battery. The working of this device is identical with that diagrammatically shown on Fig. 1 except for the fact that the contacts 45, 46, 47, 48 of the intermediary relays play the part of those 35, 36, 37, 38 of the main relays in Fig. 1; the movable contacts 49, 50 of the intermediary relays 41, 42 are in the case of Fig. 3 connected with the bus bar 15.

What is claimed is:

1. A protective device for electric distributing systems constituted by networks connected by groups of feeders working in parallel, comprising a circuit breaker at each end of each feeder, a trip coil adapted to open said circuit breaker, a directional wattmetrical relay including a working contact, a rest contact and a movable part adapted to come into contact with either of the first mentioned contacts, means normally retaining the movable part on the rest contact and acting to permit the movable part to engage the working contact when the feeder receives an amount of energy above a predetermined value; means connecting said relay with the corresponding feeder whereby the movable part may engage the working contact when the feeder receives energy by the considered end, a source of electric supply at each station for each group of feeders, a first and a second conductor connected each with one pole of said source, an auxiliary conductor, means connecting one end of the trip coils of the group of feeders with the first conductor, means connecting the second end of said trip coils with the auxiliary conductor when the movable part of the corresponding relay engages the working contact, means connecting the auxiliary conductor with the second conductor when the movable part of one at least of the relays is engaged with the rest contact.

2. A protective device for electric distributing systems constituted by networks connected by groups of feeders working in parallel, comprising a circuit breaker at each end of each feeder, a trip coil adapted to open said circuit breaker, a directional wattmetrical relay including a working contact, a rest contact and a movable part adapted to come into contact with either of the first mentioned contacts, means for normally retaining the movable part on the rest contact and acting to permit the movable part to engage the working contact when the feeder receives an amount of energy above a predetermined value; means connecting said relay with the corresponding feeder whereby the movable part may engage the working contact when the feeder receives energy by the considered end; a source of electric supply at each station for each group of feeders, a first and a second conductor connected each with one pole of said source, an auxiliary conductor, means connecting one end of the trip coils of the group of feeders with the first conductor, means connecting the second end of the trip coils with the working contact of the corresponding relay, means connecting the rest contacts of the relays with the second conductor, means connecting the movable part of the relays with the auxiliary conductor.

3. A protective device for electric distributing systems constituted by networks connected by groups of feeders working in parallel, comprising at each end of each feeder a circuit breaker, a trip coil adapted to open said circuit breaker, a directional wattmetrical relay including a working contact, a rest contact and a movable part adapted to come into contact with either of said contacts, restoring means for retaining the movable part on the rest contact and permitting the movable part to engage the working contact only when the feeder receives an amount of energy above a predetermined value, means connecting said relay with the corresponding feeder whereby the movable part may engage the working contact only when the feeder receives energy by the considered end, a source of electric supply at each station for each group of feeders, a first and a second conductor connected each with one pole of said source, an auxiliary conductor, means connecting one end of the trip coils of the group of feeders with the first conductor, a two way switch relay for each feeder, means to energize said switch relay when the movable part of the wattmetrical relay engages its working contact, means to connect the second end of the trip coils with the auxiliary conductor when the corresponding switch relay is energized, means to connect the auxiliary conductor with the second conductor when one at least of the switch relays is deenergized.

In testimony whereof we have affixed our signatures.

LUCIEN GEORGES DUPUIS.
GEORGES TINEL.